(12) United States Patent
Ragan (10) Patent No.: US 11,053,084 B2
(45) Date of Patent: Jul. 6, 2021

(54) LIM CAN MOVER

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/649,816

(22) PCT Filed: Sep. 20, 2018

(86) PCT No.: PCT/US2018/052025
§ 371 (c)(1),
(2) Date: Mar. 23, 2020

(87) PCT Pub. No.: WO2019/078997
PCT Pub. Date: Apr. 25, 2019

(65) Prior Publication Data
US 2020/0307920 A1    Oct. 1, 2020

Related U.S. Application Data

(60) Provisional application No. 62/573,258, filed on Oct. 17, 2017.

(51) Int. Cl.
| | |
|---|---|
| *B65G 47/22* | (2006.01) |
| *B65G 54/02* | (2006.01) |
| *B07C 5/08* | (2006.01) |
| *B65G 47/24* | (2006.01) |
| *B65G 15/12* | (2006.01) |
| *B65G 23/23* | (2006.01) |

(52) U.S. Cl.
CPC ............. *B65G 47/24* (2013.01); *B65G 54/02* (2013.01); *B65G 15/12* (2013.01); *B65G 23/23* (2013.01); *B65G 2201/0252* (2013.01); *B65G 2203/0233* (2013.01); *B65G 2203/042* (2013.01); *B65G 2811/0668* (2013.01)

(58) Field of Classification Search
CPC ............ B65G 54/02; B65G 47/22; B07C 5/08
USPC ...................................... 198/370.13; 209/907
See application file for complete search history.

(56) References Cited

U.S. PATENT DOCUMENTS

| | | | |
|---|---|---|---|
| 2,857,059 A | 10/1958 | Goerlich et al. | |
| 3,788,447 A | 1/1974 | Stephanoff | |
| 3,830,353 A | 8/1974 | Mojden | |
| 3,850,109 A * | 11/1974 | Thornton | ................ B60L 13/10 |
| | | | 104/285 |
| 4,069,145 A | 1/1978 | Sommer, Jr. et al. | |
| 4,197,934 A * | 4/1980 | Matsui | .................... B61B 13/04 |
| | | | 104/287 |
| 4,437,799 A | 3/1984 | Liu et al. | |

(Continued)

FOREIGN PATENT DOCUMENTS

| | | |
|---|---|---|
| DE | 9417849 U1 | 12/1994 |
| DE | 10200504476 A1 | 3/2007 |

(Continued)

*Primary Examiner* — Douglas A Hess
(74) *Attorney, Agent, or Firm* — James T. Cronvich (57) ABSTRACT

Can conveyors using various stator coil configurations to spread, gap, align, lane, reject, singulate, and rotate aluminum cans as they are propelled along the length of the conveyor. The electrically conductive cans acting as rotors form linear-induction motors (LIMs) with the stators to move the cans.

19 Claims, 9 Drawing Sheets

(56) References Cited

U.S. PATENT DOCUMENTS

| | | | |
|---|---|---|---|
| 4,590,411 A * | 5/1986 | Kelly | G05B 19/39 |
| | | | 318/616 |
| 4,595,870 A | 6/1986 | Chitayat | |
| 4,704,568 A | 11/1987 | Beck et al. | |
| 5,251,741 A | 10/1993 | Morishita et al. | |
| 5,483,042 A | 1/1996 | Sprenger et al. | |
| 6,215,260 B1 * | 4/2001 | Hinds | H02K 41/025 |
| | | | 318/135 |
| 6,354,224 B1 * | 3/2002 | Devnani | B61L 23/005 |
| | | | 104/130.01 |
| 7,086,519 B2 * | 8/2006 | Veit | B07C 5/362 |
| | | | 198/370.02 |
| 7,597,187 B2 * | 10/2009 | Bausenwein | B41F 13/00 |
| | | | 198/580 |
| 7,863,782 B2 | 1/2011 | Matscheko et al. | |
| 9,346,623 B2 | 5/2016 | Ragan | |
| 9,371,194 B2 * | 6/2016 | Ragan | B65G 17/345 |
| 9,617,089 B2 * | 4/2017 | Josefowitz | B60L 13/003 |
| 9,630,781 B1 | 4/2017 | Ogle, II | |
| 9,845,197 B2 * | 12/2017 | Gauch | B65G 47/2445 |
| 9,969,566 B1 * | 5/2018 | Payan | B65G 47/763 |
| 10,456,811 B2 * | 10/2019 | Ragan | B07C 5/16 |
| 10,457,497 B1 * | 10/2019 | Mehendale | B65G 54/02 |
| 2018/0111166 A1 | 4/2018 | Ragan | |
| 2019/0315574 A1 * | 10/2019 | Mehendale et al. | |
| 2021/0053776 A1 * | 2/2021 | Mehendale et al. | |

FOREIGN PATENT DOCUMENTS

| | | |
|---|---|---|
| JP | 57-170324 A | 10/1982 |
| JP | 62-285820 A | 12/1987 |
| JP | 63-198570 A | 8/1988 |
| JP | 63-202261 A | 8/1988 |
| JP | 01-133817 A | 5/1989 |
| JP | 01-231651 A | 9/1989 |
| JP | 02-087903 A | 3/1990 |
| JP | 05-026920 U | 4/1993 |
| JP | 07-251931 A | 10/1995 |
| JP | 7291430 A | 11/1995 |
| JP | 2006206229 A | 8/2006 |
| JP | 2014024558 A | 2/2014 |
| WO | 2014043821 A1 | 3/2014 |
| WO | 2015148833 A1 | 10/2015 |
| WO | 2016069189 A1 | 5/2016 |
| WO | 2016069190 A1 | 5/2016 |
| WO | 2016-196087 A1 | 12/2016 |

* cited by examiner

LIM CAN MOVER

BACKGROUND

The invention relates generally to power-driven conveyors and more particularly to conveyors using linear induction to move electrically conductive articles such as aluminum cans.

Cans undergo many operations during their manufacture. They must be oriented or positioned correctly for many of these operations. Cans are packed together en masse for washing and drying. But coating and decorating often require the cans to be spaced apart in a single file. In many cases cans have to be switched between different conveyors for load-leveling or diversion to various decoration machines. Because aluminum cans are thin-walled and prone to tipping and denting, they have to be handled gently. But conventional can conveyors with rails and pushers can tip or dent cans by direct contact.

SUMMARY

One version of a can conveyor system embodying features of the invention comprises a conveyor and a stator. The conveyor has a width that extends from a first side to a second side and conveys cans along a conveying path between the first and second sides. The stator includes two or more overlapping sets of coils that produce electromagnetic flux waves that induce currents in the cans passing the stator along the conveying path. The currents interact with the electromagnetic flux waves to produce forces that divert the cans toward at least one of the first and second sides.

Another version of a can conveyor system comprises a conveyor and a stator. The conveyor has a width that extends from a first side to a second side and conveys cans along a conveying path between the first and second sides. The stator includes one or more sets of coils each producing an electromagnetic flux wave that induces currents in the cans passing the stator along the conveying path. The currents interact with the electromagnetic flux waves to produce forces that divert the cans toward at least one of the first and second sides. The field pattern produced by the one or more sets of coils is skewed toward the first side of the conveyor with a maximum field strength closer to the first side than to the second side.

Yet another version of a can conveyor system comprises a conveyor, a stator, first and second coil controllers, and a pair of side rails. The conveyor has a width that extends from a first side to a second side and conveys cans along a conveying path between the first and second sides. The stator is disposed below the conveying path and includes two sets of coils. The first set of coils extends in length along the conveying path and in width inward from the first side. The second set of coils extends in length along the conveying path and is separated from the first set by a seam and extends in width inward from the second side. The first coil controller controls the first set of coils, and the second coil controller controls the second set of coils. The side rails confine the cans to a single file straddling the seam. The first and second sets of coils produce magnetic flux waves that propel the cans along the conveying path. The first and second coil controllers energize the first and second sets of coils at different frequencies to rotate the cans as they are propelled along the conveying path or at the same frequency to avoid rotation.

Still another version of a can conveyor system comprises a conveyor belt and a stator. The conveyor belt has first and second sides and conveys a stream of cans along an upper carryway run in a direction of belt travel. The stator is disposed below the carryway run in a central portion of the conveyor belt and producing an electromagnetic flux wave that travels in a direction opposite to the direction of belt travel. The electromagnetic flux wave induces currents in the cans passing over the stator that interact with the electromagnetic flux waves to produce forces that impede the motion of the cans in the direction of belt travel to divert the stream toward the first and second sides of the conveyor belt and spread out the cans.

DETAILED DESCRIPTION

Figure 1A:
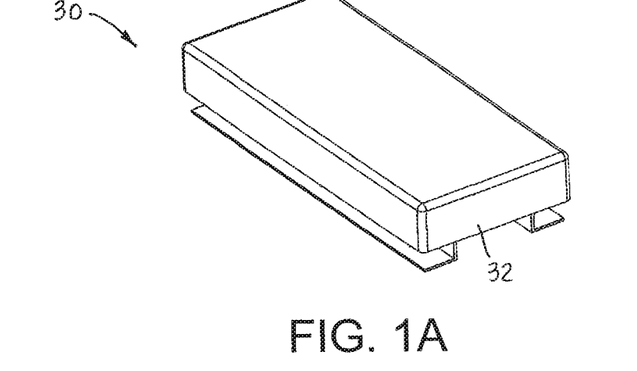
FIG. 1A is an isometric view of a linear-induction-motor (LIM) stator enclosure.
Figure 1B:
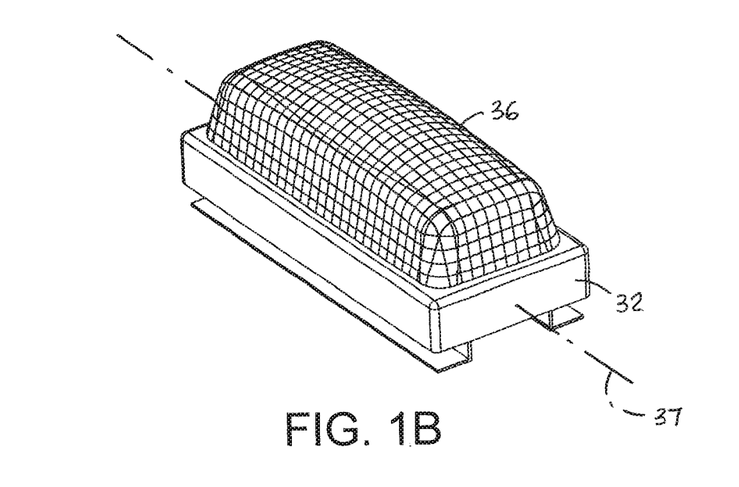
FIG. 1B is an isometric view as in FIG. 1A with the electromagnetic field pattern shown.
Figure 1C:
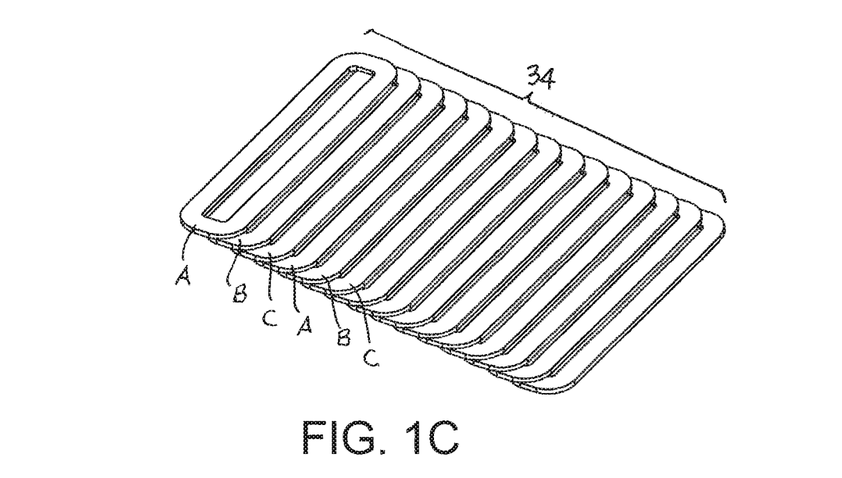
FIG. 1C is an isometric view of the stator coils housed in the enclosure of FIG. 1A.

A stator assembly 30 useful for moving electrically conductive articles, such as cans, is shown in FIGS. 1A-1C. The stator assembly 30 includes an enclosure 32 housing a series of three-phase coils 34. The coils 34 are arranged linearly in A-B-C phase sequence along the length of the enclosure 32. All the A coils are connected electrically in series to form A windings. The B and C coils are similarly connected in series to form B and C windings. The windings are connected to a conventional three-phase stator coil controller (not shown). The controller drives the coils 34 to produce an electromagnetic wave that advances along the length of the enclosure 32. Because all the stator coils 34 are the same in FIG. 1C, they produce a uniform field pattern 36 whose strength, or amplitude, across the width of the stator enclosure 32 is symmetrical about the enclosure's longitudinal centerline 37. The field strength is slightly higher at the centerline 37 than at the two outer sides of the enclosure 32. The three-phase coil controller drives the stator coils 34 with three-phase currents that generate an electromagnetic wave that propagates along the length of the stator enclosure. The traveling electromagnetic wave induces currents in the electrically conductive aluminum cans. The induced currents generate a magnetic field that opposes the stator field and applies a reaction force against the cans. The greater the field strength, the greater is the repulsive force on the cans. Thus, the electrically conductive cans, acting as forcers, form linear-induction motors (LIMs) with the stator coils 34.

Figure 2:
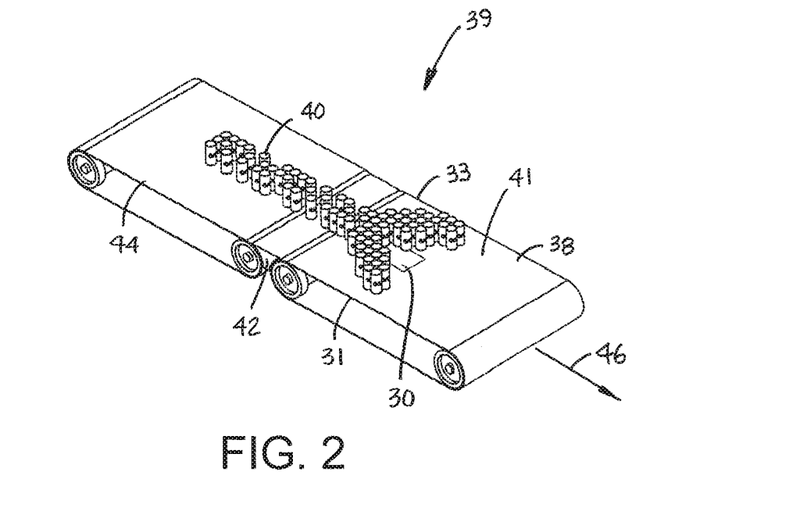
FIG. 2 is an isometric view of a can spreader using a stator enclosure as in FIG. 1A and embodying features of the invention.
Figure 3:
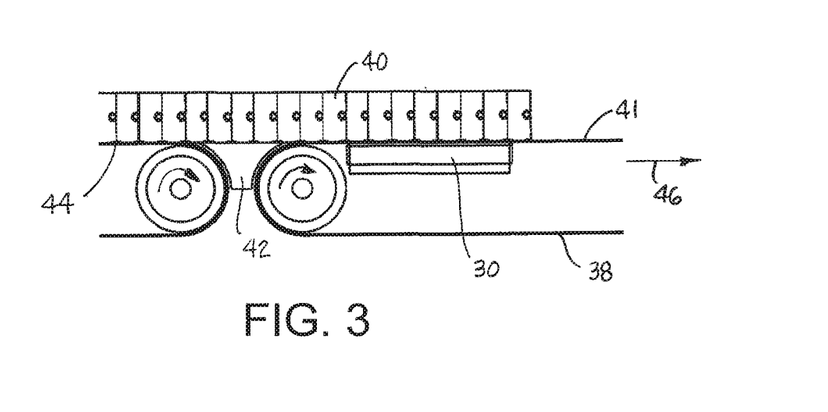
FIG. 3 is a side elevation view of the can spreader of FIG. 2.

FIGS. 2 and 3 show a can-spreading conveyor system that embodies features of the invention. The can spreader 39 is realized by a linear stator assembly 30 as in FIG. 1A just below the upper carryway run of a conveyor belt 38 providing a flat top surface 41 for the cans. A stream of cans 40 is fed onto the conveyor belt 38 across a transfer plate 42 from an upstream infeed conveyor 44 such as another conveyor belt or chain or a LIM-driven conveyor. When the cans 40, advancing in a conveying direction 46 in the direction of belt travel along a conveying path, are above the LIM stator 30, the stator's electromagnetic flux wave, which travels in a direction opposite to the direction of belt travel, induces currents in the cans that produce magnetic fields and a repelling force that impedes the forward motion of the cans to divert the stream of cans laterally toward first and second sides 31, 33 of the conveyor belt 38. In this way the cans 40 are spread from their tight ranks on the upstream conveyor 44 to a spread formation on the downstream belt 38.

Figure 4:
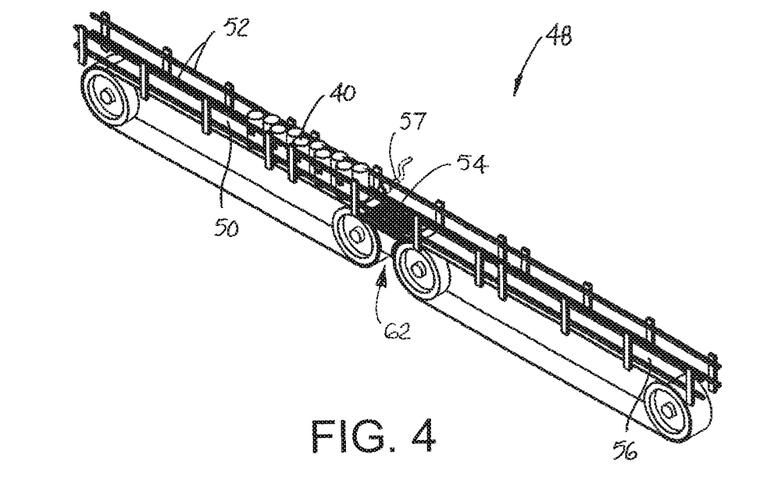
FIG. 4 is an isometric view of a can gapper embodying features of the invention.
Figure 5:
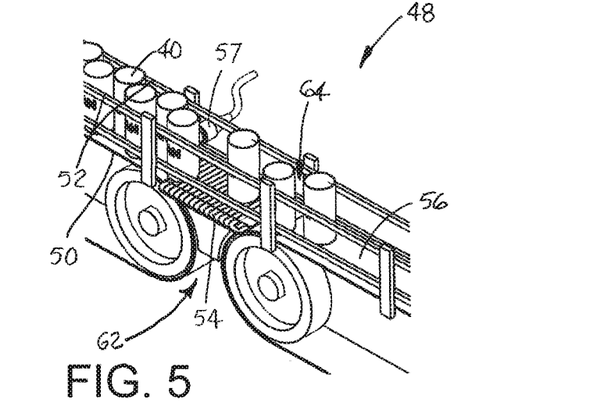
FIG. 5 is an enlarged view of a portion of the can gapper of FIG. 4.
Figure 6:
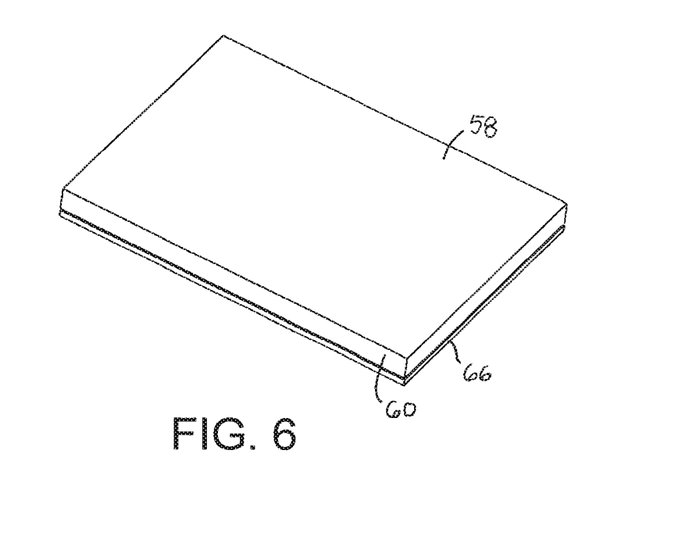
FIG. 6 is an isometric view of a stator enclosure used in the can gapper of FIG. 5.

A gapping conveyor 48 using a LIM stator like that of FIGS. 1A-1C and embodying features of the invention is shown in FIGS. 4 and 5. The gapper 48 includes an upstream infeed conveyor 50 on which cans 40 are tightly packed, but generally confined to a single file between side rails 52. A LIM stator 54 forms an active transfer plate between the infeed conveyor 50 and a downstream conveyor 56. A position sensor 57 sends a position signal to a processor (not shown) programmed to detect the presence of a can 40 exiting the infeed conveyor 50. Upon detecting a can 40 passing the position sensor 57, the processor sends a signal to the three-phase stator controller to energize the stator 54. Alternatively, the position sensor can be eliminated with the stator controller continuously energizing the stator 54. The traveling electromagnetic wave generated by the stator 54 accelerates the cans 40 as they advance over the stator 58 (FIG. 6). The acceleration of the cans 40 upon entering the transfer in the space 62 between the infeed and discharge conveyors 50, 56 introduces a gap 64 between consecutive cans entering the discharge conveyor. As shown in FIG. 6, the stator coils (not shown) can be embedded in potting material 60, such as a polymer or an iron-polymer composition. The stator assembly can include a back iron plate 66 to lower the reluctance and increase the flux density of the stator field. This construction applies to the stator assembly 30 of FIG. 1A as well.

Figure 7:
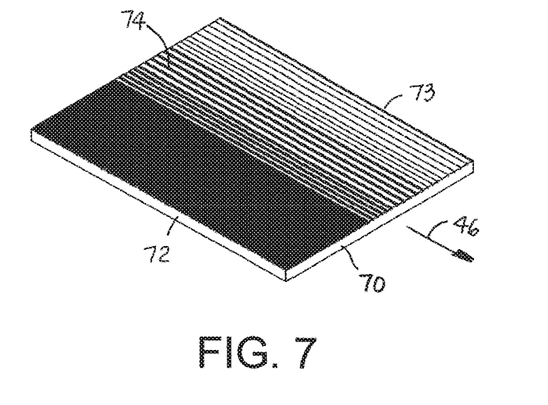
FIG. 7 is an isometric view of a LIM stator with a graded electromagnetic field pattern caused by a graded iron concentration.
Figure 8:
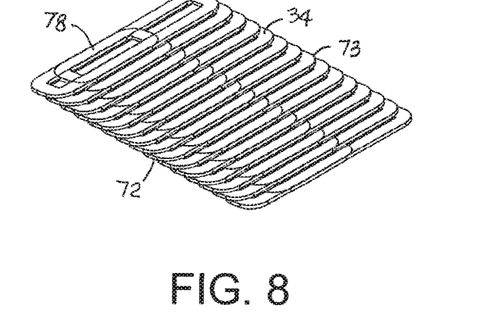
FIG. 8 is an isometric view of the coils of a LIM stator with a graded electromagnetic field caused by boost coils.
Figures 9, 10:
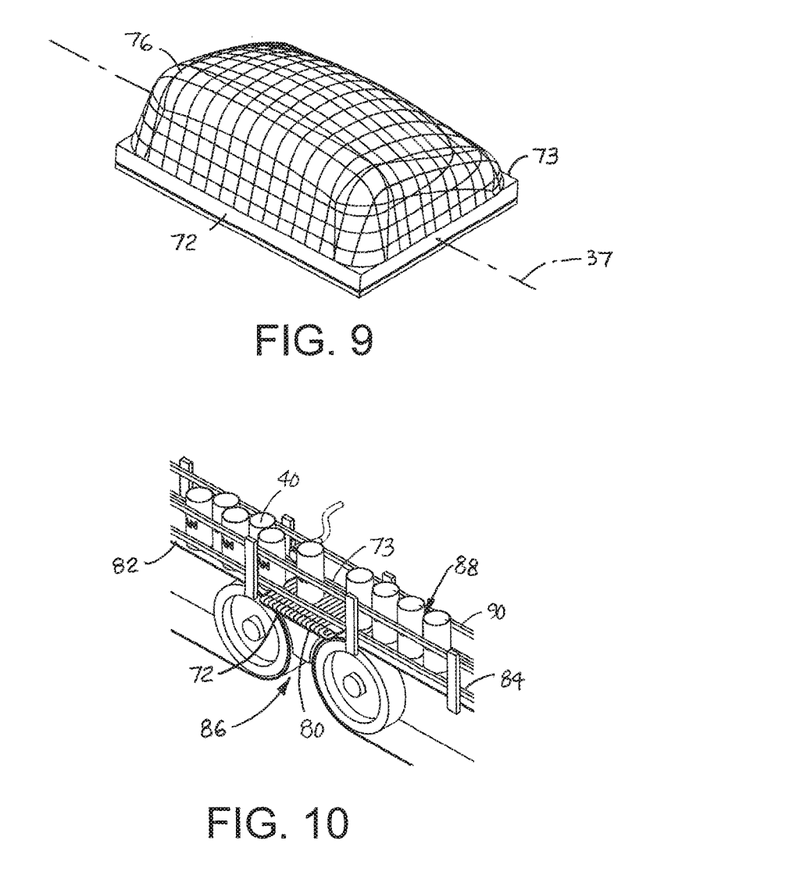
FIG. 9 is an isometric view of the electromagnetic field pattern of a graded-field LIM stator as in FIG. 7 or FIG. 8.
FIG. 10 is an isometric view of a can aligner embodying features of the invention including a graded-field stator as in FIG. 7 or FIG. 8.

FIGS. 7 and 8 show two ways of skewing a stator's field strength to one side as in FIG. 9. The stator coils in FIG. 7 are potted in a polymer-iron composite material 70 in which the iron concentration decreases from a first side 72 to a laterally opposite second side 73. The iron density is represented by the density of lines 74 shown running the length of the potting 70 in the conveying direction 46. The higher concentration of iron at the first side 72 increases the field strength 76 at the first side 72 relative to the field strength at the second side 73. A similar field pattern is produced alternatively by the addition of a set of boost coils 78 to the set of uniform stator coils 34 as shown in FIG. 8. The three-phase boost coils 78, which have widths that extend across the width of the conveyor a distance less than the widths of the wider stator coils 34, are located closer to the first side 72 than to the second side 73 and overlap the stator coils 34. Thus, they increase the stator field strength 76 at the first side 72 relative to the strength at the second side 73 with a maximum field strength where the two sets 78, 34 of coils overlap. Both techniques produce the field pattern of FIG. 9 skewed toward the first side 72 and asymmetric across the width of the stator about its centerline 37.

The asymmetric field pattern 76 produced by either the graded iron concentration 74 of FIG. 7 or the offset boost coils 78 of FIG. 8 is used in a gapping aligner shown in FIG. 10. A stator 80 using either of these techniques is positioned between an infeed conveyor 82 and a downstream discharge conveyor 84 to transfer cans 40 across an intervening space 86. The traveling electromagnetic stator wave with its field strength skewed to the first side 72 both accelerates the cans 40 longitudinally across the space 86 to introduce a gap 88 between consecutive cans and diverts the cans laterally into alignment along a side rail 90 at the second side 73.

Figure 11:
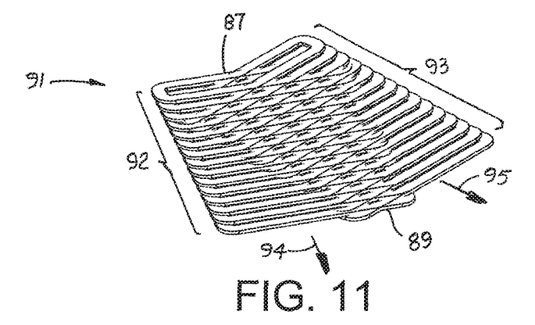
FIG. 11 is an isometric view of the composite coils of a LIM stator usable in a can laner or switch.

Two sets 92, 93 of interdigitated three-phase stator coils are shown in FIG. 11 forming a stator 91. The two sets 92, 93 are arranged oblique to each other and partly overlapping. The overlap is greater at the upstream end 87 than at the downstream end 89. When energized, each set 92, 93 produces an electromagnetic wave that directs cans in its direction of propagation in a first conveying direction 94 along a first branch of the conveying path or a second conveying direction 95 along a second branch of the conveying path.

Figure 12:
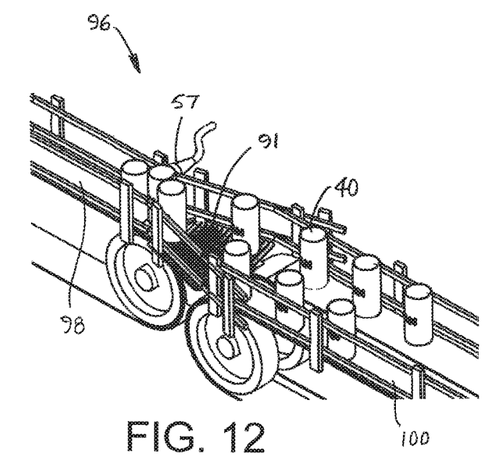
FIG. 12 is an isometric view of a can laner embodying features of the invention including a LIM stator as in FIG. 11.
Figure 13:
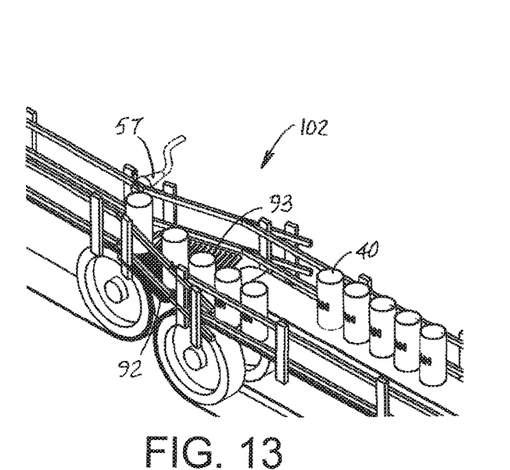
FIG. 13 is an isometric view of a can switch using a LIM stator as in FIG. 11.
Figure 14:
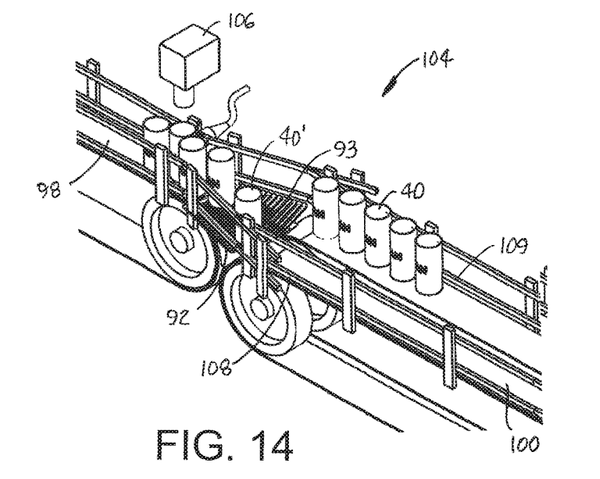
FIG. 14 is an isometric view of a can QC station with reject using a LIM stator as in FIG. 11.

FIG. 12 shows a can laner 96 using the stator 91 of FIG. 11. Cans 40 on an infeed conveyor 98 are transferred across the stator 91 along the conveying path to a discharge conveyor 100. When a can 40 exiting the infeed conveyor 98 is detected by the position sensor 57, the sensor sends a detection signal to the stator coil controller, which energizes one set of stator coils (92, FIG. 11) or the other (93, FIG. 11). In the case of the laner 96, the coil controller alternately energizes each set 92, 93 can by can to direct consecutive cans 40 to opposite sides of the discharge conveyor 100. The tarter 96 of FIG. 12 can be operated instead as a switch conveyor 102 as shown in FIG. 13. The physical construction is identical. The difference is that the stator controller alternately energizes each set 92, 93 of stator coils after directing a predetermined number of cans 40 to each side. In this example the laner 102 is shown directing a series of five cans 40 to a side before switching to the other side. In both the laner 96 of FIG. 12 and the switch 102 of FIG. 13, a position sensor 57 upstream of the stator notifies the processor of the impending entrance of a can 40 onto the stator. The processor then sends a signal to the stator controller to direct the can to a selected side of the conveyor. FIG. 14 shows a quality-control (QC) station 104 using a camera 106 as a part of a defect detector. The camera 106 is positioned at the exit of the infeed conveyor 98 and sends a video image to the processor. If the processor detects a defective can 40' from the video, it sends a reject signal to the stator controller to energize the first set 92 of stator coils to divert the defective can to a first side 108 of the discharge conveyor 100. If no defects are detected, the processor sends a pass signal to the coil controller to energize the second set 93 of stator coils to divert the acceptable can 40 to the second side 109 of the discharge conveyor 100. In this way rejects 40' are culled from acceptable cans 40 and conveyed to a different destination. And the camera 106 can also be used as the position sensor.

Figure 15:
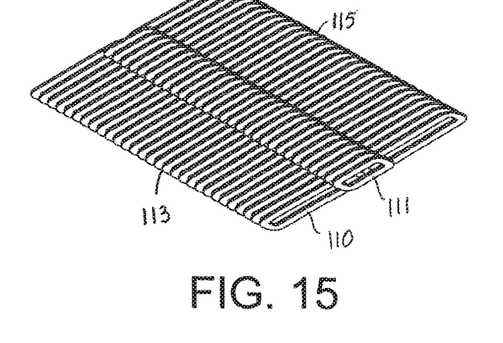
FIG. 15 is an isometric view of the coils of a LIM stator with central boost coils.
Figure 16:
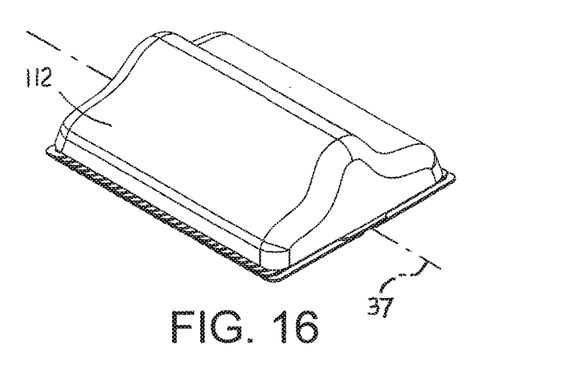
FIG. 16 is an isometric view of the electromagnetic field pattern of the LIM stator of FIG. 15.

FIG. 15 shows a set 110 of wide coils overlain by a set 111 of overlapping narrower boost coils extending longitudinally along the center of the wide coils. With both sets 110, 111 energized, the resulting field strength 112 shown in FIG. 16 is greatest along the centerline 37 of the stator midway between the first and second sides 113, 115. When cans transfer across such a stator, cans that arrive slightly to one side of the stator are diverted fully to that side as they advance atop the stator. Thus, the stator configuration is used to lane and align cans along the outer sides of the conveyor where the field strength is weakest.

Figure 17:
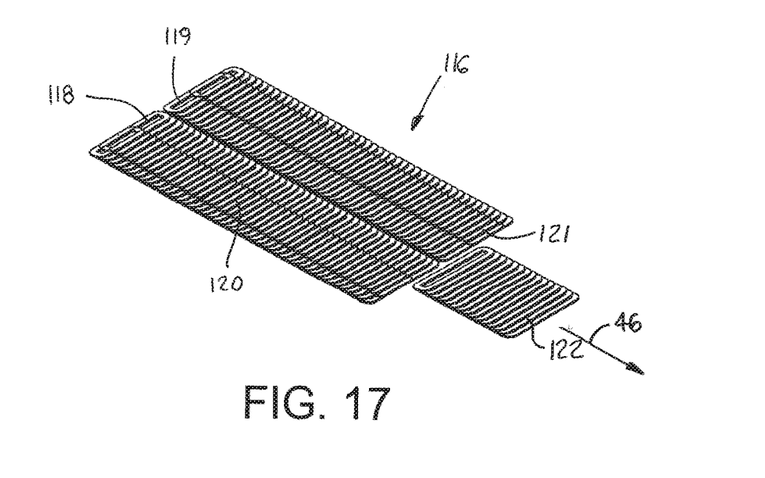
FIG. 17 is an isometric view of the coils of a LIM stator configured for singulating cans.
Figure 18:
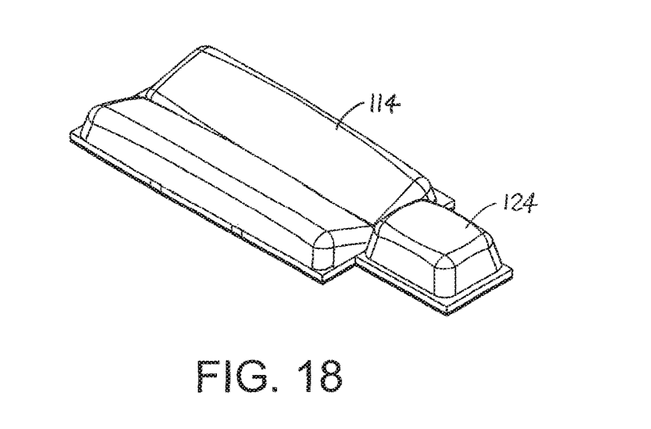
FIG. 18 is an isometric view of the electromagnetic field pattern of the LIM stator of FIG. 17.

The stator-coil configuration in FIG. 17 produces a field strength pattern 114 as shown in FIG. 18. The stator configuration 16 comprises two side-by-side pairs 118, 119 of coil sets with offset field-boost coil sets 120, 121 like the one in FIG. 8. Both pairs 118, 119 are energized together. Because the boost coil sets 120, 121 are positioned toward the outer sides of each pair 118, 119, the field strength is likewise greater away from the centerline. Thus, the stator configuration 116 produces a field pattern that tends to center cans by diverting them laterally toward the center of the conveyor. Uniform-field stator coils 122 downstream produce a symmetric field pattern 124 as in FIG. 1B to propel cans in the conveying direction 46.

Figure 19A:
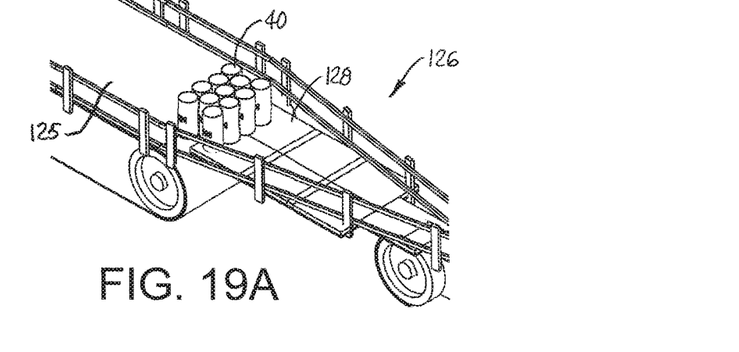
FIGS. 19A-19D are isometric views of a singulation sequence of a can singulator embodying features of the invention and using a LIM stator with coils as in FIG. 17.
Figure 19B:
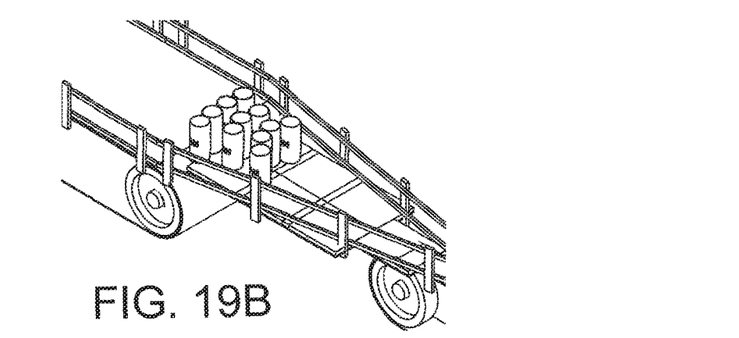
Figure 19C:
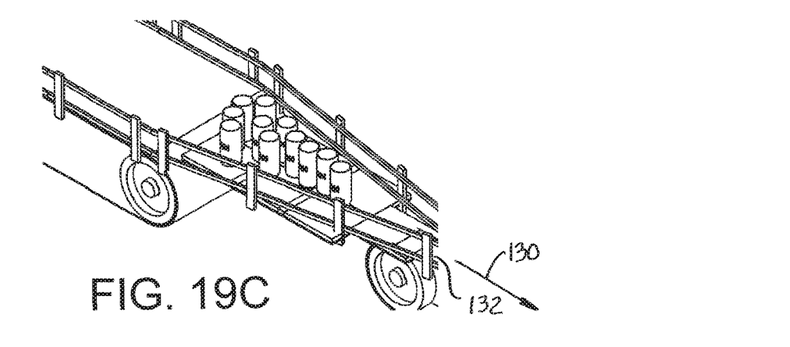
Figure 19D:
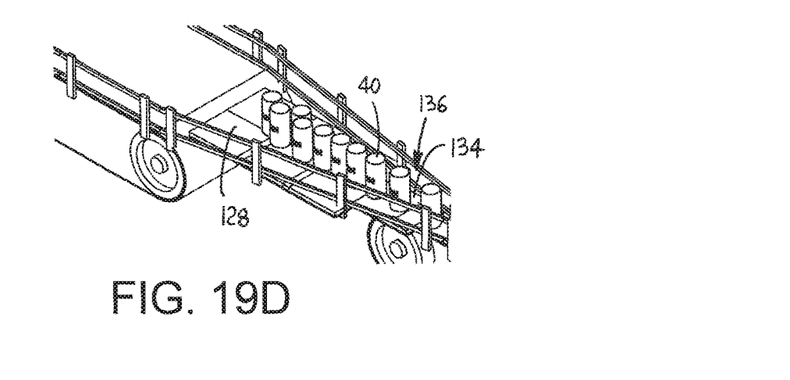

The stator configuration 116 of FIG. 17 is shown in a can singulator 126 in FIGS. 19A-19D. In FIG. 19A a mass of cans 40 is fed by an infeed conveyor 125 onto the top surface of a stator enclosure 128 housing a stator 116 configured as in FIG. 17. As illustrated in the sequence of FIGS. 19A-19B, the side-by-side stators with the field-boost coils center the cans 40 while propelling them in the conveying direction 130 toward a discharge conveyor 132. The uniform-field stator coils (122, FIG. 17) in the downstream portion 134 of the stator enclosure 128 accelerate the cans 40 forward to interpose gaps 136 between consecutive cans.

Figure 20:
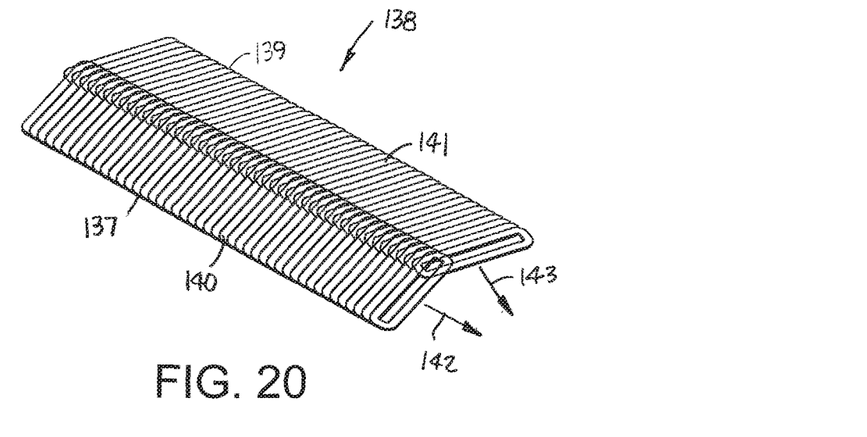
FIG. 20 is an isometric view of angled coils of a LIM stator configured for singulating cans.

Another stator-coil configuration 138 for centering cans is shown in FIG. 20. Two sets 140, 141 of stator coils are arranged in parallel. Each coil of the first set 140 is arranged oblique to the sides 137, 139 of the stator 138 in a first direction 142, and each coil of the second set 141 is arranged oblique to the sides of the stator in a different second direction 143. Each set 140, 141 is energized by the same drive waveform to produce in-phase electromagnetic waves traveling in converging conveying directions 142, 143 that push cans toward the center of the stator configuration 138.

Figure 21A:
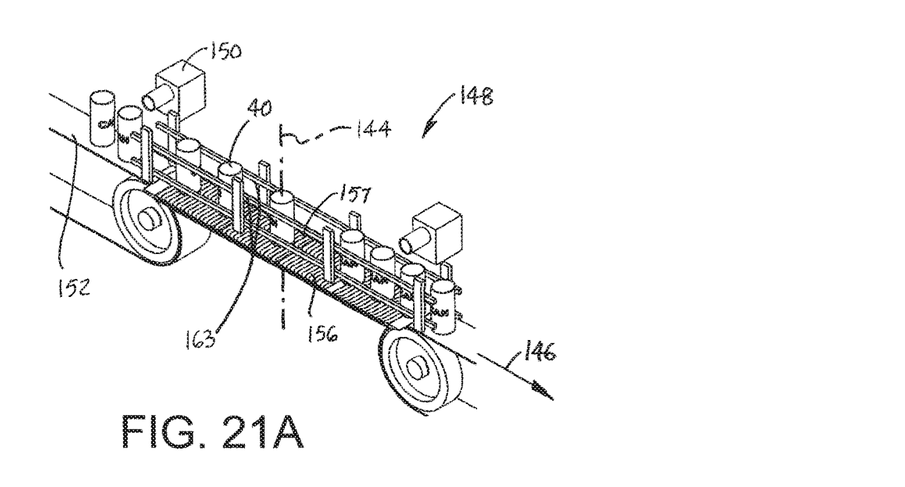
FIGS. 21A and 21B are isometric and top plan views of a dual-stator can turner embodying features of the invention.
Figure 21B:
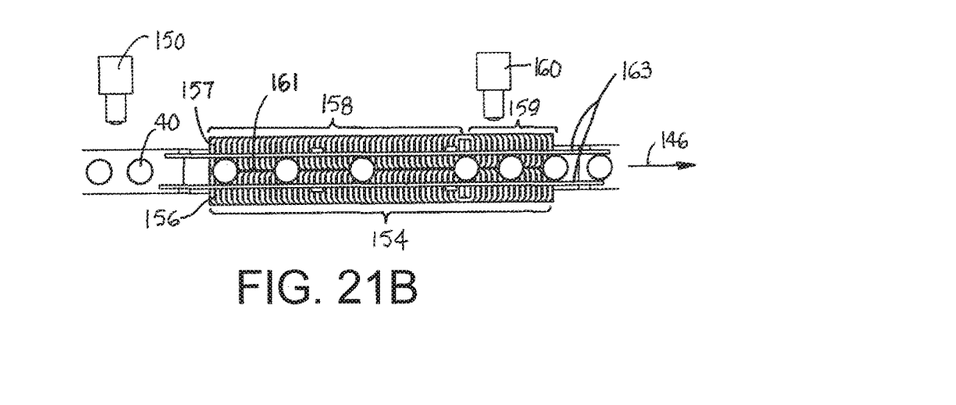

As shown in FIGS. 21A and 21B, the cans 40 can also be rotated about a vertical axis 144 as they are being propelled along in a conveying direction 146 in a can-turning stator configuration. The can turner 148 includes an orientation sensor, shown as a camera 150, positioned adjacent to an infeed conveyor 152 just upstream of a stator 154 constructed of two side-by-side uniform stator coil sets 156, 157 separated by a seam 161. Side rails 163 confine the cans 40 propelled along the conveying path by the coil sets 156, 157 to a single file straddling the seam 161. The camera 150 produces images that are used by a processor running an imaging program to detect cans 40 that have to be turned and how far they have to be rotated about their vertical axes 144 to be correctly oriented for a downstream operation such as decorating. The camera can also be used as a position sensor to determine when a can will enter the turner. The processor commands stator coil controllers, each connected to a corresponding coil set 156, 157, to drive the upstream stator coils 158 at different frequencies to cause the cans 40 to rotate as they are propelled along the stator 154 in the conveying direction 146. The frequency difference depends on the degrees of rotation required by each can as determined by the processor from the image produced by the camera 157. The coil controllers energize the two coil sets 156, 157 at the same frequency to avoid rotation of the cans 40. Thus, the orientation sensing executed by the processor using the camera's images compares each can's actual orientation to a target orientation, determines the directed difference between the actual and target orientations, and sets the energization frequencies of the two sets of coils 156, 157 through the coil controllers as a function of the directed difference. An optional second camera 160 downstream of the rotator stator coils 158 takes images of the passing cans to check the cans for correct rotation by the can turner. The downstream stator coils 159 are operated in phase to propel the cans 40 in the conveying direction 146 without further rotation.

Figure 22A:
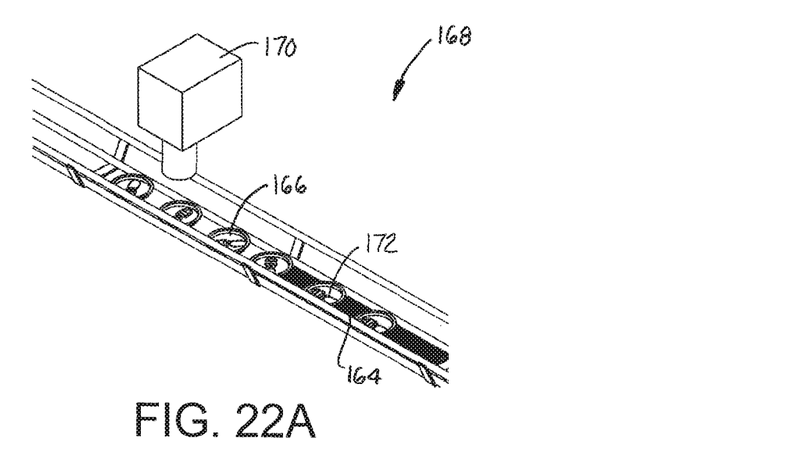
FIGS. 22A and 22B are isometric and top plan views of a dual-stator can-end turner as in FIGS. 21A and 21B for rotating can ends with pull tabs.
Figure 22B:
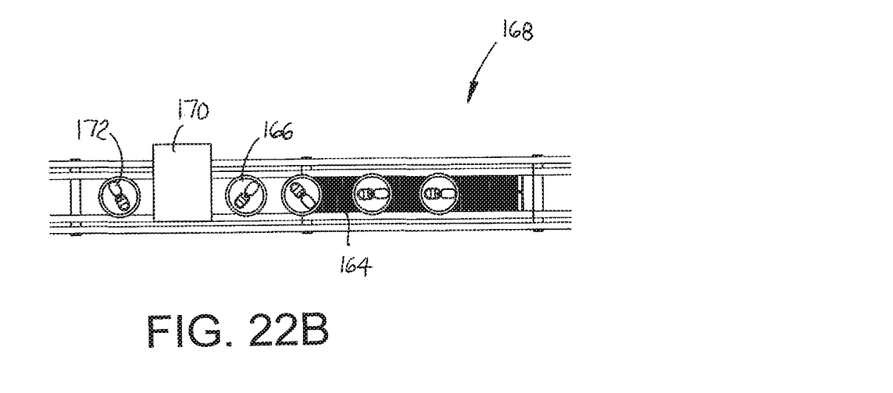

A can-end turner 168 as shown in FIGS. 22A and 22B has a stator 164 that operates similar to the can turner 148 of FIGS. 21A and 21B. The can ends 166 are first imaged by a camera 170 looking down on the can ends to detect the angular positions of the pull tabs 172. The stator 164 is then operated in the same way as the stator 154 of FIGS. 21A and 21B to rotate each can end 166 the correct amount so that the tabs 172 are all aligned for downstream processing.

In some of the versions of the various can movers described in detail, the stator enclosures were not shown to better illustrate their coil configurations. In all cases, however, the stators would be housed in an enclosure with a flat top surface along which the cans slide as they are propelled along. The flat top surface can be integral with the stator enclosure, or it can be a separate piece such as a low-friction sheet sitting atop the stator enclosure. Or the stator enclosure can be positioned below a conveyor belt having a flat top surface as for the can spreader of FIGS. 2 and 3. And although the electrically conductive articles are described as aluminum cans for convenience, the term cans is defined for purposes of the description and claims to include, besides cans, aluminum bottles and other lightweight, electrically conductive containers or products forming forcers and not to include intervening can carriers, such as trays, that include forcers and form an integral part of the LIM and the conveyor system.

What is claimed is:

1. A can conveyor system comprising:
   a conveyor having a width extending from a first side to a second side, the conveyor conveying cans along a conveying path between the first and second sides;
   a stator including two or more overlapping sets of coils producing electromagnetic flux waves that induce currents in the cans passing the stator along the conveying path, wherein the currents interact with the electromagnetic flux waves to produce forces that divert the cans toward at least one of the first and second sides;
   a flat top surface on which the cans slide and through which an electromagnetic field pattern produced by the electromagnetic flux waves is directed to induce the currents in the cans.

2. A can conveyor system as in claim 1 wherein the two or more overlapping sets of coils include:
   a first set of coils extending along the conveying path and having a first width that extends across the width of the conveyor;
   a second set of coils overlapping the first set of coils, wherein the second set of coils extends along the conveying path and has a second width that extends across the width of the conveyor a distance less than the first width;
   wherein the electromagnetic flux waves produced by the first and second sets of coils produce a field pattern with a maximum field strength where the first and second coils overlap.

3. A can conveyor system as in claim 2 wherein the first and second sets of coils are centered between the first and second sides of the conveyor to produce a field pattern with a maximum field strength midway between the first and second sides.

4. A can conveyor system as in claim 2 wherein the second set of coils is closer to the first side of the conveyor than to the second side of the conveyor to produce a field pattern skewed toward the first side with a maximum field strength closer to the first side.

5. A can conveyor system as in claim 1 wherein the two or more overlapping sets of coils include:
   a first set of coils extending from an upstream end to a downstream end along a first branch of the conveying path in a first direction;
   a second set of coils extending from an upstream end to a downstream end along a second branch of the conveying path in a second direction oblique to the first direction;
   wherein the overlap of the first and second sets of coils is greater at the upstream end than at the downstream end.

6. A can conveyor system as in claim 5 further comprising a coil controller energizing only one set of the first and second sets of coils at a time.

7. A can conveyor system as in claim 6 wherein the coil controller alternately energizes the first and second sets of coils can by can.

8. A can conveyor system as in claim 6 wherein the coil controller alternately energizes the first set and second sets of coils after the passage of a predetermined number of cans.

9. A can conveyor system as in claim 6 further comprising a defect detector detecting defects in the cans and sending a reject signal to the coil controller to energize the second set of coils to divert defective cans to the second side of the conveyor.

10. A can conveyor system as in claim 1 further comprising an infeed conveyor feeding cans in a single file to the conveyor.

11. A can conveyor system as in claim 1 wherein the two or more overlapping sets of coils include:
    a first set of coils extending along the conveying path from an upstream end to a downstream end;
    a second set of coils extending along the conveying path from an upstream end to a downstream end parallel to the first set of coils;
    wherein the first and second sets overlap midway between the first and second sides of the conveyor;
    wherein each coil of the first set is oblique to the first and second sides in a first direction and each coil of the second set is oblique to the first and second sides in a second direction that converges with the first direction toward the downstream end to center cans between the first and second sides.

12. A can conveyor system as in claim 1 wherein the stator includes first and second pairs of overlapping sets of coils arranged side by side, wherein each pair includes:
    a first set of coils extending along the conveying path;
    a second set of narrower coils overlapping the first set of coils along a portion of the width of the first set, wherein the electromagnetic flux waves produced by the first and second sets of coils produce a field pattern with a maximum field strength where the first and second coils overlap;
    wherein the second set of narrower coils of the first pair overlap the first set of coils of the first pair closer to the first side of the conveyor than to the second pair and the second set of narrower coils of the second pair overlap the first set of coils of the second pair closer to the second side of the conveyor than to the first pair to produce a bilaterally skewed field pattern with maximum field strengths near the first and second sides of the conveyor to divert cans toward the center of the conveyor.

13. A can conveyor system comprising:
    a conveyor having a width extending from a first side to a second side, the conveyor conveying cans along a conveying path between the first and second sides;
    a stator including one or more sets of coils each producing a field pattern and an electromagnetic flux wave that induces currents in the cans passing the stator along the conveying path, wherein the currents interact with the electromagnetic flux waves to produce forces that divert the cans toward at least one of the first and second sides;
    wherein the field pattern produced by the one or more sets of coils is skewed toward the first side of the conveyor with a maximum field strength closer to the first side than to the second side.

14. A can conveyor system as in claim 13 wherein the stator includes potting material in which one set of coils is embedded and wherein the potting material includes ferrous material whose concentration decreases from the first side of the conveyor to the second side of the conveyor to skew the field pattern toward the first side.

15. A can conveyor system as in claim 13 wherein the one or more sets of coils include two overlapping sets of coils including:
    a first set of coils extending along the conveying path and having a first width that extends across the width of the conveyor;
    a second set of coils overlapping the first set of coils, wherein the second set of coils extends along the conveying path and has a second width that extends across the width of the conveyor a distance less than the first width;

wherein the electromagnetic flux waves produced by the first and second sets of coils produce a field pattern with a maximum field strength where the first and second coils overlap; and wherein the second set of coils is closer to the first side of the conveyor than to the second side of the conveyor to produce a field pattern skewed toward the first side with a maximum field strength closer to the first side.

16. A can conveyor system comprising:
a conveyor having a width extending from a first side to a second side, the conveyor conveying cans along a conveying path between the first and second sides;
a stator disposed below the conveying path and including:
  a first set of coils extending in length along the conveying path and in width inward from the first side;
  a second set of coils extending in length along the conveying path and separated from the first set of coils by a seam and extending in width inward from the second side;
a first coil controller controlling the first set of coils and a second coil controller controlling the second set of coils;
a pair of side rails confining the cans to a single file straddling the seam;
wherein the first and second sets of coils produce magnetic flux waves that propel the cans along the conveying path; and
wherein the first and second coil controllers energize the first and second sets of coils at different frequencies to rotate the cans as they are propelled along the conveying path or at the same frequency to avoid rotation.

17. A can conveyor system as in claim 16 comprising an orientation sensor determining the orientation of each of the cans as they pass by on the conveyor upstream of the stator, comparing the orientation of each can to a target orientation, and adjusting the frequencies of the first and second sets of coils as a function of the directed difference between can's orientation and the target orientation.

18. A can conveyor system as in claim 17 further comprising a second orientation sensor downstream of the stator to check the rotated cans for proper orientation.

19. A can conveyor system comprising:
a conveyor belt having first and second sides and conveying a stream of cans along an upper carryway run in a direction of belt travel;
a stator disposed below the carryway run in a central portion of the conveyor belt and producing an electromagnetic flux wave traveling in a direction opposite to the direction of belt travel;
wherein the electromagnetic flux wave induces currents in the cans passing over the stator that interact with the electromagnetic flux waves to produce forces that impede the motion of the cans in the direction of belt travel to divert the stream toward the first and second sides of the conveyor belt and spread out the cans;
a flat top surface on which the cans ride and through which an electromagnetic field pattern produced by the electromagnetic flux waves is directed to induce the currents in the cans.

* * * * *